Patented Feb. 9, 1943

2,310,784

UNITED STATES PATENT OFFICE 2,310,784

PROCESS FOR THE PREPARATION OF GAS MIXTURES FOR CATALYTIC PROCESSES

Wilhelm Herbert, Frankfort-on-the-Main-Eschersheim, Germany; vested in the Alien Property Custodian No Drawing. Application January 27, 1939, Serial No. 253,227. In Germany August 23, 1937

1 Claim. (Cl. 23—2)

This invention relates to a process of preparing gas mixtures to be subjected to a catalytic process.

When carrying out catalytic processes, for example, in the synthesis of ammonia, the synthesis of methyl alcohol, the Fischer-Tropsch benzine synthesis, and other catalytic reactions based on the hydrogenation of oxides of carbon with or without the application of pressure, it is important to use gases in as pure a state as possible, as otherwise an uneconomically high consumption of catalyst must be expected.

For the synthesis of ammonia, gas mixtures of nitrogen and hydrogen are employed. Otherwise, mixtures of carbon monoxide and hydrogen or carbon dioxide and hydrogen are generally subjected to the catalytic treatment by the aforesaid syntheses. In addition to the foregoing constituents, which participate in the reaction, the gases or gas mixtures then also contain larger or smaller amounts of gaseous substances, such as methane and the like, which do not take part in the reaction.

The manifold known variations of the water gas process are mainly used for the production of the gases intended for synthetic reactions. However, coke oven gases, low-temperature carbonisation gases, natural gas or like gases are also frequently utilised, at least in part, for catalytic reactions. These gases are generally high in methane, and their employment in the synthesis must therefore usually be preceded by splitting-off of methane by heating to 1300 to 1500°. To this end, for example, coke oven gas is passed together with steam, in a known process, into the incandescent bed of a water gas producer. However, the methane in the gases is frequently also converted by catalytic reaction, the gases being passed with steam over catalysts, for example nickel catalysts, at an elevated temperature of, for example, 700 to 900°, the methane reacting in accordance with the equation:

$$CH_4 + H_2O = CO + 3H_2$$

If carbon dioxide is present in the gas, the reaction takes place partly in accordance with the equation:

$$CH_4 + CO_2 = 2CO + 2H_2$$

The gases or gas mixtures intended for synthesis processes are passed for purifying purposes, prior to being used in the synthesis process, through devices in which the inorganic sulphur Other substances contained in the gases and capable of poisoning the catalysts—such as polymerising hydrocarbons—are excluded from the purification plant, as far as possible, by suitably conducting the process of producing the gases. The dry purification process utilising bog iron ore is generally employed for removing the inorganic sulphur compounds. However, other dry purification processes and, in special cases, also washing processes (for example the alkacite process, the thylox process, or combinations of these processes) may also be employed. The alkacite process consists essentially in washing the gases with an aqueous solution of the sodium salt of aminoacetic acid and the thylox process consists essentially in washing the gases with an aqueous solution of sodium arsenate.

For the removal of organic sulphur compounds use is principally made of catalytic processes in which the gases are passed at high temperatures over catalytically active media, for example over hot, alkalinised active carbon, heated lead chromate or, with particular advantage, strongly alkalinised heated iron hydroxide masses. In the last-mentioned process the treatment takes place in cylindrical containers containing a layer from 1 to 2 metres in height of granular masses of iron hydroxides impregnated with about 30 to 40% of sodium carbonate, and the gases are passed therethrough at high temperatures. The treatment of the gases takes place at from 200 to 400° C., depending on the working of the fine purification mass. The latter is generally changed after becoming charged with from 6 to 8% of sulphur.

It has now been found in practice that the organic sulphur compounds are not removed, by the known hot fine purification processes, sufficiently to ensure a lengthy life (for example exceeding several months) for the catalysts in the catalytic apparatus connected in rear thereof. Such apparatus, connected in rear of the purification apparatus, comprise not only the apparatus for the synthetic production of motor fuels or the like, as already stated at the beginning, but also the apparatus in which the above described methane conversion is carried out, in cases where the gases contain methane. It is precisely in conversion plants, for example for the conversion of fuel distillation gases into crude synthesis gases, that inadequately pre-purified gases have a particularly detrimental action, since the catalysts (generally composed of nickel)

drocarbons contained in the gases. Such resin-forming hydrocarbons are also contained to a considerable extent in coke oven gas debenzolated by the washing oil process. The resin-formers, however, do not merely have a harmful action in the succeeding synthesis apparatus or conversion apparatus, but the life of the hot fine purification mass, through which the gases have to pass in preparation for the synthesis process, is also quite considerably curtailed by them. Thus, for example, the absorptive capacity of alkalinised iron hydroxide, for sulphur, amounts to only 4 to 6% of the weight of the mass when resin-formers are present. In the presence of resin-formers, a resinification of the active surface of the hot fine purification mass occurs, the mass being, as it were, lacquered by the resin-formers, so that the chemical reaction constantly abates.

According to the present invention, the gases intended for the synthetic reaction or for conversion, are first treated for the removal of the organic sulphur compounds and, if required, of the resin-formers, by means of active carbon, and are then only treated in a per se known hot fine purification apparatus at temperatures above 100°, preferably above 200°. If the gases also contain hydrogen sulphide, they are advantageously subjected to hydrogen sulphide purification before the treatment with active carbon. The active carbon treatment takes place approximately at room temperature and is preferably conducted in such a manner that the sulphur compounds boiling over 50°, such as thiophene and other cyclic sulphur compounds, and also the resin-formers are chiefly retained.

It has been found that by the active carbon treatment, followed by hot fine purification, according to the present invention, the organic sulphur compounds are practically completely removed from the gases, and that the hot fine purification can now be conducted at a temperature about 50° lower than without pretreatment by active carbon. Particularly when using alkalinised iron hydroxide masses, the life of the masses rose to almost double. The principal advantage of the invention, however, is found in its effect on the contact masses of the actual catalytic apparatus, for example the apparatus for methane conversion, carbon monoxide hydrogenation, methyl alcohol synthesis, and the like. Thus it was found, for example, that the life of the contact masses in the Fischer-Tropsch benzine synthesis rose by 100%, while the yield was simultaneously improved. The profits obtainable by employment of the invention amount to a multiple of the cost involved by the active carbon treatment. In some cases the cost of the active carbon treatment is actually covered by the production of residual benzene and resin-formers, of which from 0.5 to 2 grams per cm. or more is contained in most crude synthesis gases produced from bituminous fuels.

A further advantage of the present invention resides in the fact that owing to the milder working conditions under which the hot fine purification apparatus can now be operated, the inconvenient reformation of resin-formers in the fine purification mass is eliminated. A source of trouble which is very disagreeable in most synthesis processes is thereby removed.

The invention enables the dimensions of the hot fine purification apparatus to be considerably reduced. In the normal way the gases are passed through the hot fine purification apparatus in such a manner as to have a time of stay therein of 25 seconds. The term "time of stay" means that time that a particle of gas would require at 0° to pass through the contact chamber if the latter were free from contact mass. For example, when the cross-section of the contact chamber is one square metre and the depth of the charge is 2 metres, the time of stay would be 25 seconds with a gas throughput of 28 normal cubic metres at a pressure of 1 atmosphere, and 250 seconds at a pressure of 10 atmospheres. According to the invention, the time of stay of the gases in the hot fine purification apparatus can be made considerably shorter, for example it can be reduced to from 5 to 8 or 15 seconds. If the hot fine purification is carried out under elevated pressure, the time of stay of the gases in the hot fine purification apparatus is preferably kept below $20\sqrt{p}$ seconds at an assumed pressure of $p$ atmospheres. If the speed of the gas be kept below the time calculated from the above formula, the reformation of resin-formers in the fine purification mass can be dependably avoided.

The active carbon charged with sulphur compounds and resin-formers during operation is steamed out, dried and cooled in known manner, and may be reactivated many times by this known means or by other measures promoting the desorption. The active carbon treatment of the gases can take place at normal pressure. In some cases, however, it may also be of advantage to carry out the treatment under elevated pressure. In cases in which the gases are already under pressure, the active carbon treatment is preferably carried out at the pressure of the gas.

In order further to reduce the cost of the process of the invention, the active carbon apparatus may also additionally be employed at the same time for other purposes. Thus, for example, on completion of the charging of the active carbon with the impurities in the crude synthesis gases, the benzine or alcohol containing residual or end gases of the synthesis may also be passed through the active carbon for the purpose of further charging with these substances. The impurities adsorbed in the active carbon are for the most part removed, during this operation, by the more readily adsorbable benzine or alcohol fractions of the residual synthesis gases, so that an active carbon used for the pre-purification of the gas is still able to take up from the residual gas almost as much benzine as a freshly reactivated and still uncharged active carbon. Thus, if the active carbon is not steamed out until the pre-purification operation has been followed by after-treatment with residual synthesis gases and thus by after-charging with benzine or alcohol and the like, the pre-purification of the crude synthesis gases can be carried out with active carbon without giving rise to noteworthy extra cost, since the pre-purification of the crude synthesis gases can then be attended to by the plant for extracting the products from the residual synthesis gases.

An additional advantage is also obtained by the fact that, during the steaming out of the active carbon treated with synthesis residual gases, the benzine liberated at the commencement of the steaming out condenses in the still cold layers of the active carbon and thus trickles in liquid state from above downwards through the carbon. An extraction effect is thus produced, inasmuch as the benzine trickling from above downwards through the carbon extracts the elementary sulphur and those resins which had become attached to the carbon during the pre-treatment of the crude synthesis gases and are not removed by steaming out alone. This results in a prolongation of the life of the active carbon.

Example I

A gas mixture, produced by gasification of lean coal in producers of known construction and consisting of 28% of CO, 56% of hydrogen and 15% of inert substances ($N_2$, $CO_2$, $CH_4$) was cleansed of hydrogen sulphide in known manner by being passed over bog iron ore masses. After emerging from the $H_2S$ purification stage the gas contained resin-formers (ascertainable by brown discoloration when introduced into a mixture of 3 ccs. of 30% formalin solution with 100 ccs. of concentrated sulphuric acid) and also 0.1 grm. of hydrogen sulphide and 15 grms. of organic sulphur per 100 cubic metres. This gas was passed at room temperature through an active carbon plant in which the resin-formers were removed quantitatively and the organic sulphur to such an extent that no more thiophene passed out. The gases were then passed at a temperature of about 200° over granulated and strongly alkalinised iron oxide masses, consisting of iron hydroxide or so-called Lauta mass with 40% of soda. The temperature for this treatment varies in individual cases according to the age of the mass. On passing out of the fine purification plant, the gas contained no freshly formed resin-formers. It was not possible to discover reliably any further content of organic sulphur. The sulphur content was doubtlessly below 0.1 gram per 100 cubic metres. The hot, finely purified gas was passed directly into a contact furnace of the Fischer-Tropsch benzine synthesis plant. The fine purification mass was able to absorb 12% of sulphur, i. e. almost double the normal amount, before being exhausted. The life of the contact mass in the contact furnace of the benzine synthesis, which normally amounts to only three months, was six months. At the same time, the average yield of benzine, oil and paraffin was raised from 115 grams per normal cubic metre of original gas free from inert matter to 122 grams.

Example II

Coke oven gas containing resin-formers was passed, in similar manner to Example I, after being cleansed of hydrogen sulphide, through an active carbon plant which removed benzene, gasol, thiophene and resin-formers. The gas was then passed to the fine purification plant as in Example I. Since on passing out of the fine purification plant the desired composition for the synthesis had not yet been attained, the gas was passed together with steam over nickel catalysts at a temperature of about 700° for the purpose of converting the methane. The converted gas re-cooled in heat exchangers was passed, after correction of its composition by added water gas finely purified in accordance with Example I, to the synthesis plant. Without the process of the present invention no adequate fine purification of the coke oven gas high in resin-formers would have been possible at all. The conversion with nickel contact mass—in itself highly economical but sensitive to sulphur-containing gases—could then not have been employed, and expensive thermal cracking processes would have had to be used for the conversion of the methane in the coke oven gas into carbon monoxide and hydrogen.

I claim:

In the process for the preparation of gas mixtures which are to be subjected to a catalytic process involving the steps of treating the gases with active carbon at normal room temperature for the purpose of freeing them from organic sulphur compounds and any resin-formers present, and thereafter subjecting the gases to hot purification by contact with a strongly alkalinized iron oxide mass at a temperature above 100° C., the improvement according to which the active carbon charged with organic sulphur compounds is regenerated for reuse by passage therethrough of residual synthesis gases followed by steaming.

WILHELM HERBERT.